T. J. Close.
Settee Frame.
No 3,686. Reissued Oct. 26 1869.
Fig; 1.
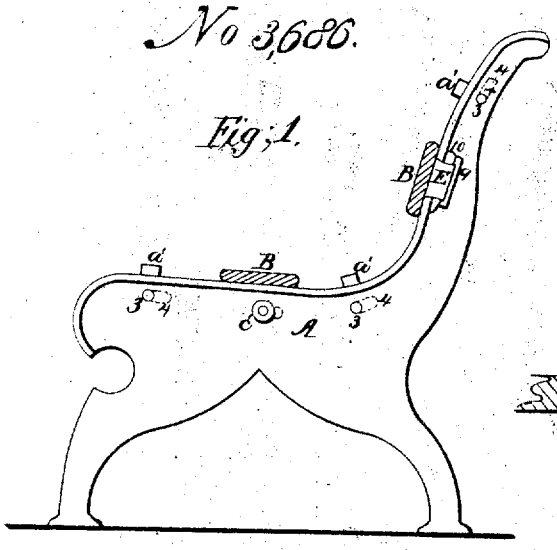
Fig; 3.
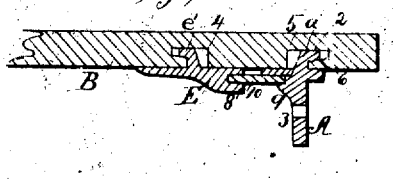
Fig; 2.
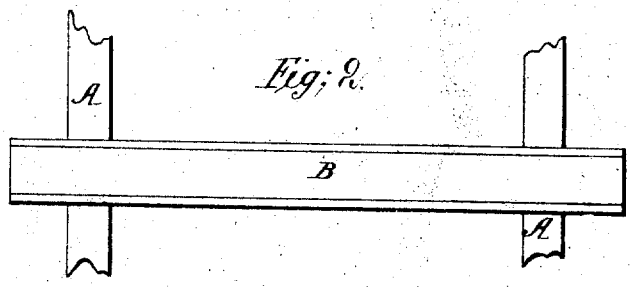
Fig; 4.
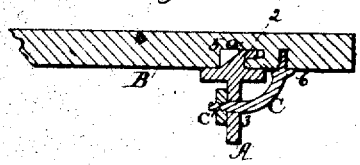
Witnesses;
Benj Morison
Wm. H. Morison
Inventor;
Thos. J. Close

United States Patent Office.

THOMAS J. CLOSE, OF PHILADELPHIA, PENNSYLVANIA.

*Letters Patent No.* 86,644, *dated February* 9, 1869; *reissue No.* 3,686, *dated October* 26, 1869.

IMPROVED SETTEE-FRAME.

The Schedule referred to in these Letters Patent and making part of the same

I, THOMAS J. CLOSE, of the city of Philadelphia, in the State of Pennsylvania, have invented certain Improvements in Settees for Parks, &c., of which the following is a specification.

*Nature and Objects of the Invention.*

Letters Patent No. 80,528, dated July 28, 1868, were granted to me for a certain "improved settee," in which wooden slats are secured in a certain peculiar manner to iron end-frames, so as to avoid the use of wood-screws, which are liable to rust and break off in a short time, and do not allow the requisite facility for putting together and taking apart the slats and frames as the seasons change; and the object of my present invention is not only to avoid the use of the objectionable wood-screws, and to afford facility in attaching together and taking apart the slats and frames, but to afford, also, a more simple, inexpensive, reliable, and durable mode of compressing and firmly holding together the said slats and frames, and preventing any oblique movements of the one upon the other in using the settee.

The first part of my invention relates to the combination of the wooden slats with the iron end-frames of the settee, by means of a series of projecting slope-sided studs on the frames, and correspondingly slope-sided or under-cut holes in the under sides of the slats, in such a manner that when the said slats are laid flat upon the said frames, with the studs of the latter in the respective holes of the former, and the slats then slipped along and pressed firmly in the proper direction of their lengths, across the frames, the said slopes of the two parts will draw the slats and frames into closer contact, with a firmness proportionate to the longitudinal pressure given to the slats; the object of this part of my invention being to afford a more simple, efficient, and reliable mode of drawing the flat contact surfaces of the said frames and slats together.

The second part of my invention relates to the combination of grooved abutting-plates, having projecting slope-sided studs inserted respectively in corresponding slope-sided or under-cut holes in the under sides of the slats, with grooves in the respective sides of the end-frames, and a key-wedge fitted therein, so that by driving the said wedge simultaneously into both of the respective grooves of the plate and frame, the inclined or sloped side of the stud on the frame and of the stud on the plate, will be forced further apart or against slopes of their respective slope-sided or under-cut holes in the slat, so as to securely and rigidly hold the said slat and frame together.

*Description of the Accompanying Drawings.*

Figure 1 is an elevation, showing the inner side of one of the two corresponding cast-iron end-frames of the settee, with transverse sections of two of the wooden slats applied thereto;

Figure 2, a plan view of the upper side of one of the wooden slats, with sectional plan views of the supporting faces of the two end-frames of the settee;

Figure 3, vertical transverse sections of the supporting-rib of the frame and of the key-wedge, in connection with vertical longitudinal sections of the abutting plate, studs, and slat; and Figure 4, a modification of the device for drawing and holding firmly together the sloping sides of the studs and of the holes in the slats.

*General Description.*

The end-frames A A are intended to be of an open or skeleton style of construction, for the purpose of giving lightness with strength, and the edges or faces to which the wooden slats B B are directly secured are cast in the well-known T-form in their transverse sections; and along in the mid-width of the flat-face surface of each, the series of studs *a'*–*a'* project at proper distances apart, to receive over them the wooden slats B, which form the seat and back of the settee.

Each of these studs *a'* is, in height or length, about equal to two-thirds of the thickness of the slats, and the upper end of each one in the series of the respective frames projects laterally, in respect to its frame, so as to form on the projecting side an inclined plane 2, or sloping surface, the series of said slope-sided studs of each of the two frames, A A, inclining or sloping toward contrary sides of the respective frames.

In the under side, near each end of each of the slats B, a hole, 5, is bored, sufficiently large and deep to readily receive within it any one of the studs *a'*, and the side of the hole which is intended to come in contact with the inclined or sloping side of the stud, is under-cut or sloped to correspond in its direction or inclination with the inclination or slope of the stud, so that when the two inclined surfaces or planes are pressed together by sliding the slat which covers the stud in the proper direction of its length, across the frame, the inclined or sloping surfaces will slide upon each other, and thus draw the slat B and the frame A into closer contact with each other.

At a short distance from the hole 5 in the slat, another like hole 7 is made, but with its sloping or under-cut side inclining in a direction directly opposite to that of hole 5; and connected with this hole 7 is the abutting-plate E, which has on one side a projecting slope-sided stud, *e'*, (like the stud *a'*,) to correspond with the hole 7.

In one end of this plate E there is a groove, 8, which corresponds with a like groove, 9, in that side of the frame A, and in these two grooves a key-wedge, 10, is fitted, so that by driving the said wedge tightly in between them, when the studs *e'* and *a'* are in proper connection with their respective holes 7 and 5, in the slat, the plate E will serve as an abutment, and cause the slat to be drawn into closer and rigid contact with the surfaces of the frame A and plate E, and consequently serve the double purpose of holding the slat B tightly against the frame A, and preventing any diagonal or oblique motions in respect to the connected frames and slats of the settee.

As a modification of the abutment-plate E and wedge 10, for drawing and tightening together the frame A and slat B, a curved draw-bolt, C, may be used. For this purpose, a slot or hole, 3, is made through the side of the frame, at a point directly below or behind the stud *a'*, so that when the one end of the curved bolt C is screwed into the under side of the slat, as indicated in fig. 4, the other end can be turned into the hole 3, and a screw-nut, *c'*, applied and screwed up against the side of the frame, so as to draw and hold tightly together the said slat and frame; but as this modification serves only to draw and hold the two parts tightly together, the abutting-plate and key-wedge, shown in fig. 3, is preferred, as it serves the additional purpose of preventing, at the same time, any diagonal or oblique motions in the slats, in respect to the frames, in using the settee or moving it about.

*Claims.*

I claim, as my invention—

1. The combination of the slope-sided or inclined studs *a'*, on the frames A, and the slope-sided or under-cut holes 5, in the slats B, substantially as and for the purpose hereinbefore set forth.

2. The combination of the abutting-plate E, wedge 10, frame A, and slat B, substantially as and for the purpose hereinbefore set forth.

3. The combination of the curved draw-bolt C and nut *c'*, with the frame A and slat B, as a modification of the wedge 10 and abutting-plate E, as and for the purpose described.

THOS. J. CLOSE.

Witnesses:
BENJ. MORISON,
WM. H. MORISON.